May 13, 1924.
S. W. JOHNSON
1,494,248
PULSATOR FOR MILKING MACHINES
Filed June 9, 1923   2 Sheets-Sheet 1
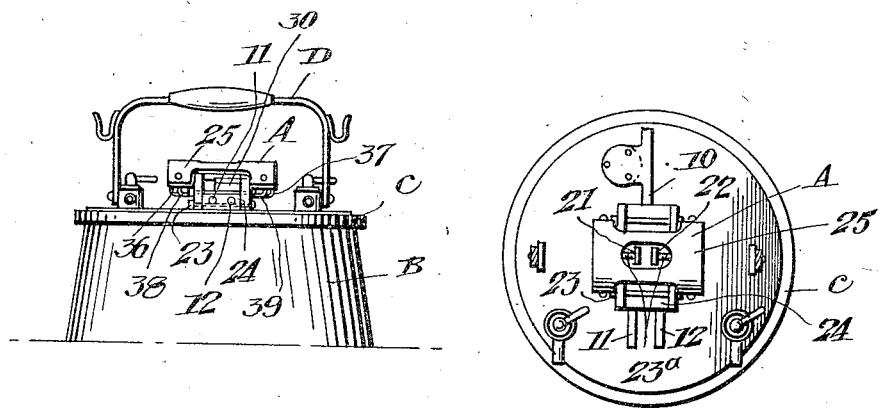
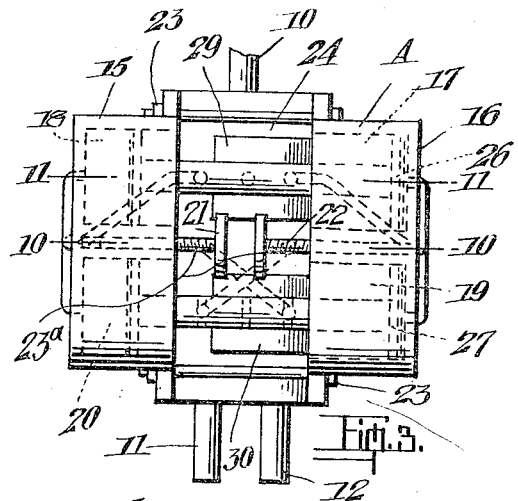
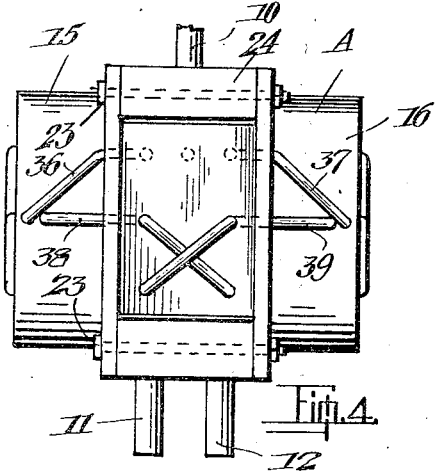
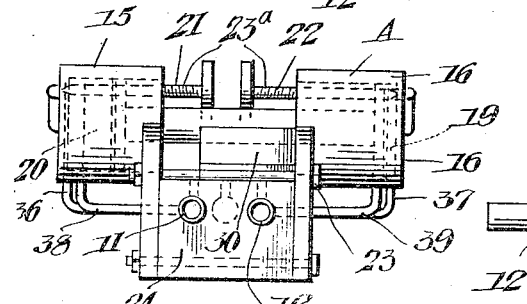
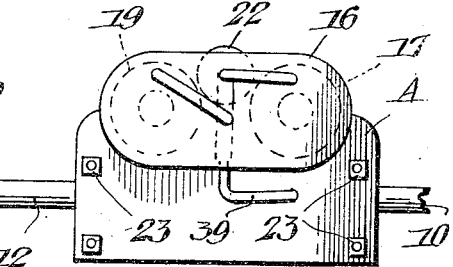
INVENTOR
SAMUEL W. JOHNSON.
BY
ATTYS.

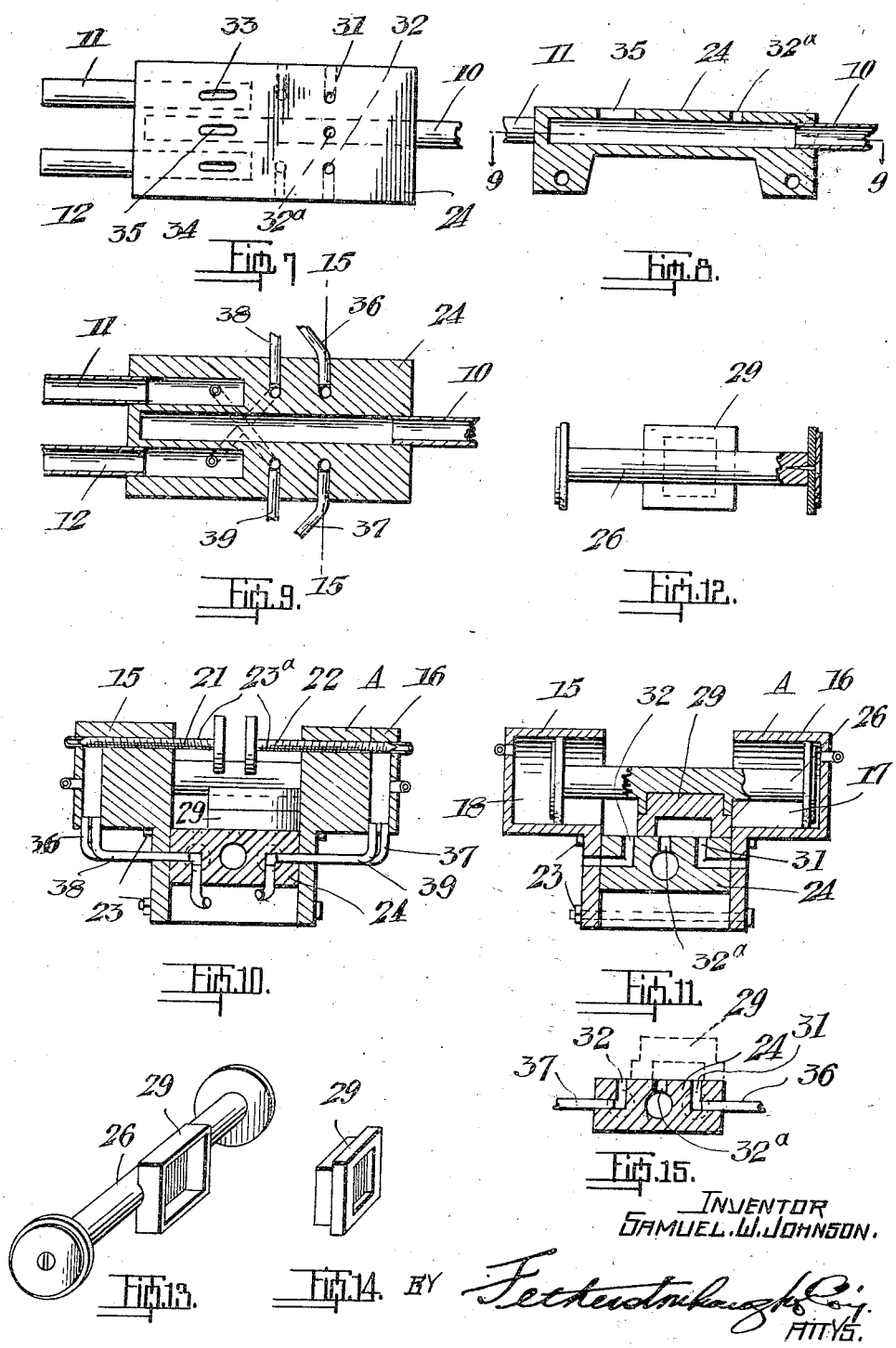

Patented May 13, 1924.

1,494,243

UNITED STATES PATENT OFFICE.

SAMUEL WILLIAM JOHNSON, OF IROQUOIS, ONTARIO, CANADA.

PULSATOR FOR MILKING MACHINES.

Application filed June 9, 1923. Serial No. 644,440.

*To all whom it may concern:*

Be it known that I, SAMUEL WILLIAM JOHNSON, a subject of the King of Great Britain, and resident of Iroquois, in the Province of Ontario and Dominion of Canada, have invented certain new and useful Improvements in Pulsators for Milking Machines, of which the following is a specification.

This invention relates to improvements in pulsators for milking machines and the objects of the invention are to provide a simply constructed and efficient device of this character in which the several parts are improved to more satisfactorily perform their various functions and in which the device as a whole will be compact, of small size and without any projections to materially interfere with its compactness.

Further objects are the provision of a pulsator of this description for changing from vacuum to atmospheric pressure in the space between the shell and the lining of the teat cup.

With the foregoing and other objects in view, the invention consists essentially in the novel arrangement and construction of parts described in the present specification and illustrated by the accompanying drawings that form part of the same.

Referring now to the drawings, in which like characters of reference indicate corresponding parts in each figure, Figure 1 is a side elevation of the pulsator fitted on the lid of a milk pail.

Figure 2 is a top plan view.

Figure 3 is a top plan view of the pulsator, with dotted lines showing the air passages.

Figure 4 is an underside view.

Figure 5 is a side elevation.

Figure 6 is an end elevation.

Figure 7 is a top plan view of the valve block, with cylinder block removed.

Figure 8 is a longitudinal section of the valve block.

Figure 9 is a section on the line 9—9 of Figure 8.

Figure 10 is a section on the line 10—10 of Figure 3.

Figure 11 is a section on the line 11—11 of Figure 3.

Figure 12 is a detail, partly in section, of the slide valve.

Figure 13 is a perspective detail of the slide valve and piston.

Figure 14 is a perspective detail of the slide valve.

Referring now to the drawings, A is an embodiment of my improved pulsator as a whole. B represents a milk pail and C a suitable lid provided with a handle D and on which is mounted in any well known manner the pulsator A formed with vacuum line pipe connection 10 and connections 11 and 12 to the air tube on teat cups.

Referring now more particularly to the pulsator, as illustrated in Figures 3 to 11, inclusive, and which comprises a pair of block members 15 and 16, each having therein two cylinders 17 and 18 and 19 and 20 with needle valves 21 and 22.

In connection with the latter, it should be noted that they each are provided with a right hand thread $23^a$.

The blocks 15 and 16 are suitably secured by screw bolts 23 to a valve block 24 and are also held together by a suitable metal cover 25 embracing the pulsator and secured thereto by screws, this cover being provided with an opening through which to operate the needle valves 21 and 22.

26 and 27 are pistons for the pairs of cylinders 17 and 18 and 19 and 20, respectively, and on which are slide valves 29 and 30, the valve 29 being designed to communicate with the round air openings 31 and 32 in the valve block and with the vacuum opening $32^a$ in turn communicating with the vacuum opening 10 in the valve block 24, as hereinafter more fully explained, while the valve 30 communicates with the slotted openings 33 and 34 in the valve block and with the central opening therebetween 35 communicating with the vacuum line.

It will thus be seen that there are in the valve block adjacent each end two series of openings extending transversely, the upper series comprising the round openings 31, $32^a$ and 32 and the other series comprising the slotted openings 33, 35 and 34. Of the two series, $32^a$ and 35 communicate directly through 10 with the vacuum line, while 33 and 34 communicate with the air tube on teat cups.

36 and 37 are passages connecting the air openings 31 and 32 with cylinders 19 and 20, while lines 38 and 39 connect the openings 33 and 34 through the needle valves with cylinders 17 and 18.

Referring now, in the operation of the device, to Figure 3, which shows in dotted lines the air passages and showing the valve and piston assembling, of which, already described, there are two, one for the round openings 31 and 32 and one for the slotted openings or holes 33 and 34, and assuming that both assemblies are at the right hand side, that is, the top valve 29 connecting the opening 32 with the opening 32ª which is connected with the vacuum line and the bottom valve 30 connecting the opening 34 with the centre 35, vacuum from 32 to cylinder 19 holds the bottom cylinder to the right hand side while vacuum from 34 through the needle valve 21 to cylinder 18 draws the top assembly across the valve block. This motion, being regulated by the needle valve, is at a predetermined speed, but as soon as it is crossed to the other side vacuum from 31, which is now under valve 29, draws the bottom cylinder across the valve block quickly and connects 33 with cylinder 17. This, also, being connected through needle valve, works at a predetermined speed.

Note the bottom valve 30 and piston assembling which changes the vacuum to atmospheric pressure in the air tubes of teat cups through openings 11 and 12 opposite 33 and 34 do so by being disconnected to the valves as the result of the needle valves having a direct connection, thereby always giving a quick movement and a quicker change and always gives the lining of the cups a chance to give the full squeeze before it moves in the other direction. This is a special feature.

It should also be noted that the needle valves each have a right hand thread and that each pointing in an opposite direction can be simultaneously turned so that one closes while the other opens, thus making it possible to get a perfectly regular stroke of the piston. This is also a special feature of my invention.

A still further feature is the elimination from the pulsator of all springs and also the double piston and valve assembling instead of the single.

While not here shown, it will be found an advantage in the working of the pulsator to add a small air chamber to each cylinder block on the underside and connect it to the cylinders which get vacuum through the needle valves, that is, cylinder 17 on one block and cylinder 18 on the other. This requires it to use more vacuum to operate piston 29 and enables the pulsator to be made smaller and still have all the working advantages of a large size pulsator.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a device of the character described and in combination with a milk pail cover or the like, a pulsator comprising a pair of oppositely arranged cylinder blocks, two pairs of cylinders in said blocks, piston means for each pair of cylinders, a valve block adapted to carry the cylinder blocks and means for detachably securing the cylinder blocks on the valve block, a centre opening in the valve block communicating with the vacuum line, a series of round apertures in the valve block communicating with the air intake and with the vacuum line, a series of slotted openings in said block communicating with the vacuum line and with the air tube line, air passages through the valve block and cylinder heads, slide valves on said pistons adapted to communicate simultaneously at one end with the air intake and vacuum line opening in the valve block and at the other end with the air tube slot and the vacuum line slot in said block, needle valve means oppositely arranged in the cylinder blocks and adapted to control the change of pressure from vacuum to atmospheric.

2. A pulsator of the character described adapted to be held to a milk pail cover having a vacuum line connection and teat cup air tube connections and including a pair of cylinder blocks with two pairs of oppositely arranged cylinder bores therein, reciprocating pistons in said bores and needle valve means for said cylinders, a valve block, a pair of air intake ports, a central port communicating with the vacuum line, a pair of slotted openings communicating with the air tube lines and a central opening communicating with the vacuum lines, slide valves carried by the pistons adapted in turn to alternately engage with one air intake port and the vacuum line port, the other slide valve simultaneously engaging with one of the air tube ports and the vacuum line port, air passages indirectly connecting the air intake ports with the needle valves whereby the change from vacuum to atmospheric pressure is controlled.

In witness whereof I have hereunto set my hand in the presence of two witnesses.

SAMUEL WILLIAM JOHNSON.

Witnesses:
R. I. DAVIDSON,
D. S. VANALLEN.